3,122,545
N,N'-ETHYLENEBIS(4,7-DIAMINO-2-ARYL-6-PTERIDINECARBOXAMIDES)
Thomas Stefan Osdene, West Chester, Pa., assignor to American Home Products Corporation, New York, N.Y., a corporation of Delaware
No Drawing. Filed Nov. 19, 1962, Ser. No. 238,783
2 Claims. (Cl. 260—251.5)

The invention relates to novel pteridine compounds having valuable diuretic and antiviral properties and to a process for the production thereof.

The invention is concerned particularly with N,N'-ethylenebis(4,7 - diamino - 2 - aryl - 6 - pteridinecarboxamides) and more specifically with compounds defined by the following formula:

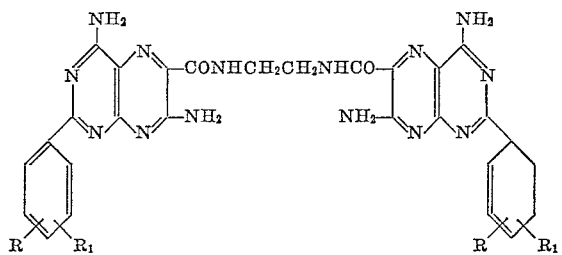

wherein R and $R_1$ may be the same or different and are selected from the group consisting of hydrogen, halogen having an atomic weight less than 80, lower alkyl, lower alkoxy and lower haloalkyl radicals.

The compounds sought to be patented most advantageously are prepared by reacting approximately one equivalent of N,N'-ethylenebis(2-cyanoacetamide), denoted by Formula II below, with approximately two equivalents of a 4,6-diamino-5-nitroso-2-arylpyrimidine, denoted below by Formula III. This reaction is preferably carried out under autogenous pressure in a neutral polar solvent in the presence of a catalytic amount of a basic condensing agent. In carrying out the subject reaction, the arylpyrimidine reactant is added to a solution containing the basic condensing agent and the selected solvent. The resulting mixture is stirred and heated to boiling, the temperature being determined by the boiling point of the selected solvent. When the mixture reaches the boiling temperature, the 2-cyanoacetamide reactant is added. The mixture is then refluxed for a few minutes and cooled. The precipitate which forms upon cooling is filtered and recrystallized from a suitable solvent, such as dimethylformamide.

Solvents found suitable for the practice of this invention include: methanol, ethanol, propanol, butanol; glycol ethers such as 2-methoxy ethanol, 2-ethoxy ethanol; methoxy and ethoxy propanols, as well as amides such as dimethylformamide, diethyl formamide and dimethyl acetamide. Suitable condensing agents for promoting the reaction include the alkali metals, their alkoxides and their alkoxy-alkoxides. Preferred among these are sodium metal, sodium methoxide, potassium ethoxide and sodium alpha-ethoxy ethoxide.

The above-described reaction proceeds as set forth below:

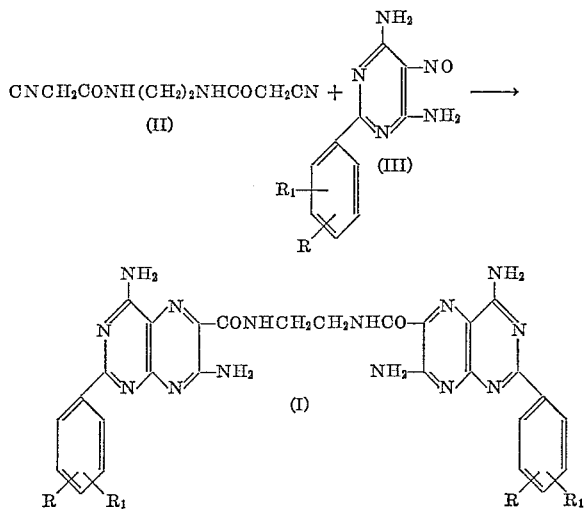

The N,N'-ethylenebis(2-cyanoacetamide) referred to above is readily prepared by an amidation reaction between an alkyl cyanoacetate and ethylenediamine, preferably in the presence of a basic catalyst such as alcoholic sodium ethoxide.

The above reaction is specifically illustrated by the following examples which constitute the best mode of carrying out the invention and in which all temperatures are in degrees centigrade.

Example I

A. To a solution of 30 g. of ethylenediamine in 65 ml. of absolute ethanol was added dropwise, with cooling 56.5 g. of ethyl cyanoacetate and 20 drops of alcoholic sodium ethoxide solution. The mixture was stirred for 5 hours, during which time a white material was deposited. This was removed by filtration and several crystallizations from ethanol gave N,N'-ethylenebis(2-cyanoacetamide), M.P. 190–190°.

Analysis.—Calculated: C=49.48, H=5.19, N=28.85. Found: CFound: C=49.73; H=5.33, N=28.94.

B. To a solution of 0.2 g. of sodium in 500 ml. of ethanol was added 6.45 g. of 4,6-diamino-5-nitroso-2-phenylpyrimidine and the mixture was stirred and brought to boiling point. Following this 2.9 g. of N,N'-ethylenebis(2-cyanoacetamide) was added and the mixture which turned from green to yellow was boiled under reflux for 15 minutes. The precipitated material was removed by filtration after cooling. Several recrystallizations from aqueous dimethylformamide afforded N,N'-ethylenebis (4,7 - diamino - 2 - phenyl - 6 - pteridinecarboxamide), M.P. 360°.

Analysis.—Calculated: C=57.13, H=4.11, N=33.32. Found: C=56.85; H=4.03; N=33.07.

Example II

N,N' - ethylenebis(4,7 - diamino 2 - p - chlorophenyl-6-pteridinecarboxamide) is prepared from 7.49 g. of 4,6-diamino - 2 - p - chlorophenyl - 5 - nitrosopyrimidine and 2.9 g. of N,N'-ethylenebis(2-cyanoacetamide), by following essentially the procedure of Example I.

Example III

N,N' - ethylenebis(4,7 - diamino - 2 - p - tolyl - 6-peteridinecarboxamide) is prepared from 6.87 g. of 4,6-diamino-2-p-tolyl-5-nitrosopyrimidine and 2.9 g. of N,N'-ethylenebis(2-cyanoacetamide), by following essentially the procedure of Example I.

Example IV

N,N' - ethylenebis(4,7 - diamino - 2 - p - anisyl - 6-pteridinecarboxamide) is prepared from 7.35 g. 4,6-diamino-2-p-anisyl-5-nitrosopyrimidine and 2.9 g. of N,N'-ethylenebis(2-cyanoacetamide), by following essentially the procedure of Example I.

EXAMPLE V

N,N' - ethylenebis(4,7 - diamino - 2 - o - tolyl - 6-pteridinecarboxamide) is prepared from 6.87 g. of 4,6-diamino-(2-o-tolyl-5-nitrosopyrimidine and 2.9 g. of N,N-ethylenebis(2-cyanoacetamide), by following essentially the procedure of Example I.

Example VI

N,N' - ethylenebis(4,7 - diamino - 2 - (3,4 - dichlorophenyl)-6-pteridinecarboxamide) is prepared from 8.55 g. of 4,6-diamino-2-(3,4-dichlorophenyl)-5-nitrosopyrimidine and 2.9 g. of N,N'-ethylenebis(2-cyanoacetamide), by following essentially the procedure of Example I.

The compounds of this invention, which have proven useful in experimental pharmacology, can be administered in a wide variety of oral or parenteral unit dosage forms singly, or in admixture with other active compounds.

The present invention also includes the process of bringing the compounds thereof into a form suitable for therapeutic administration by associating them with liquid or solid pharmaceutical carriers.

Various changes and modifications of this invention can be made by those skilled in the art to which it relates and to the extent that such variations incorporate the spirit of the invention, they are included in the scope of the claims.

What is claimed is:

1. A compound of the formula:

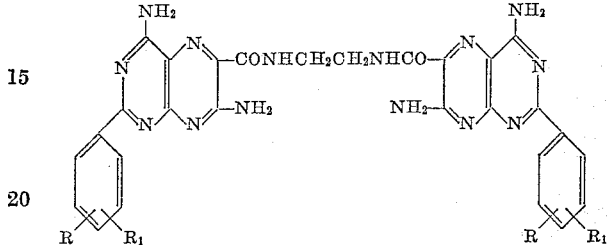

wherein R and $R_1$ are selected from the group consisting of hydrogen, halogen having an atomic weight less than 80, lower alkyl, lower alkoxy and halo(lower)alkyl.

2. N,N' - ethylenebis(4,7 - diamino - 2 - phenyl - 6-pteridinecarboxamide).

References Cited in the file of this patent

UNITED STATES PATENTS 2,975,180     Osdene _____ Mar. 14, 1961